May 15, 1951  R. L. BURKE ET AL  2,553,525
BRAKE GAUGE

Filed Oct. 19, 1946  3 Sheets-Sheet 1

INVENTORS
RALPH L. BURKE
ROY E. WASLEY
BY Cook and Schermerhorn
ATTORNEYS

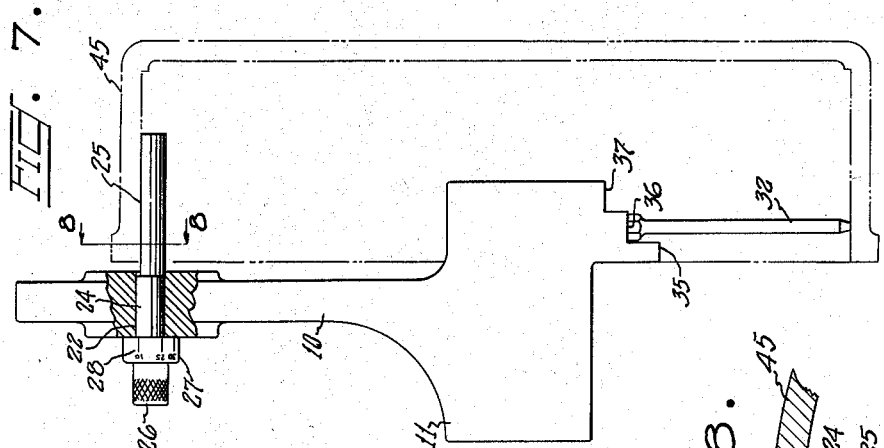
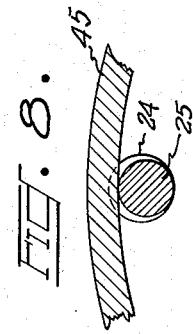
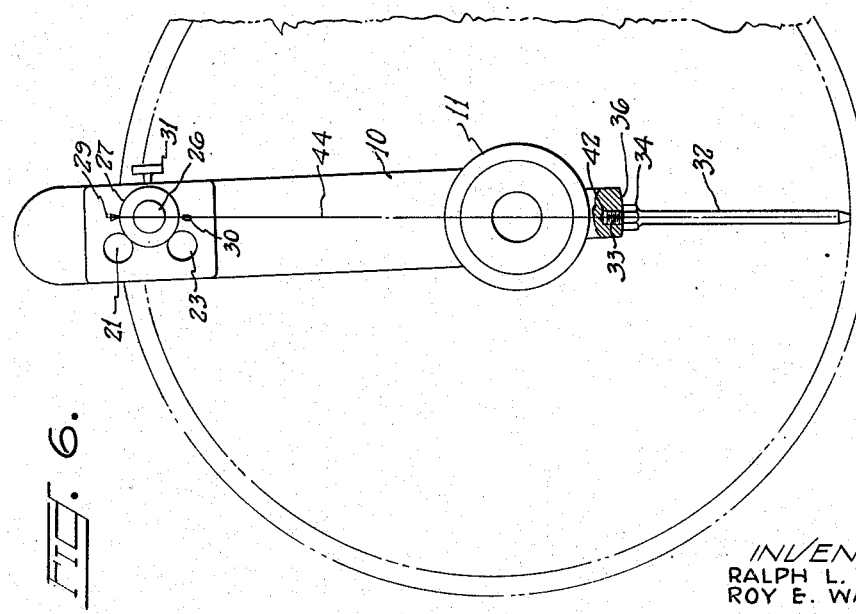

May 15, 1951 R. L. BURKE ET AL 2,553,525
BRAKE GAUGE
Filed Oct. 19, 1946 3 Sheets-Sheet 3
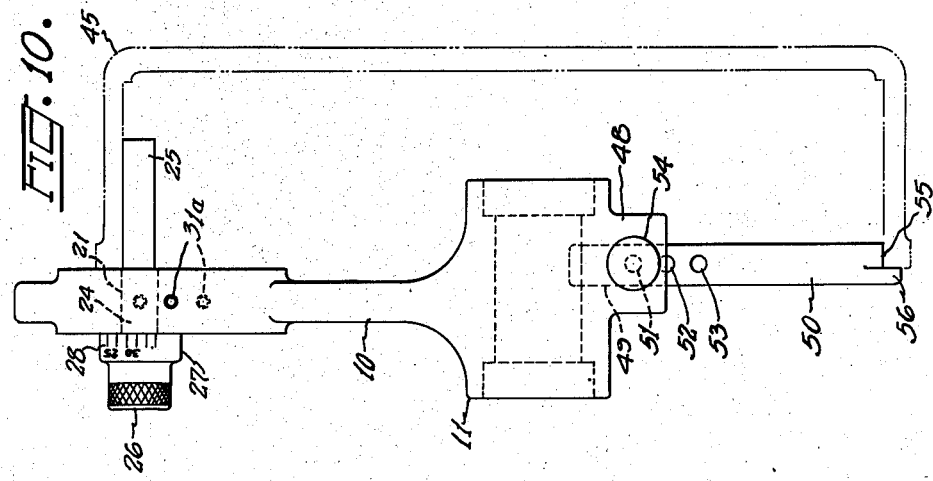
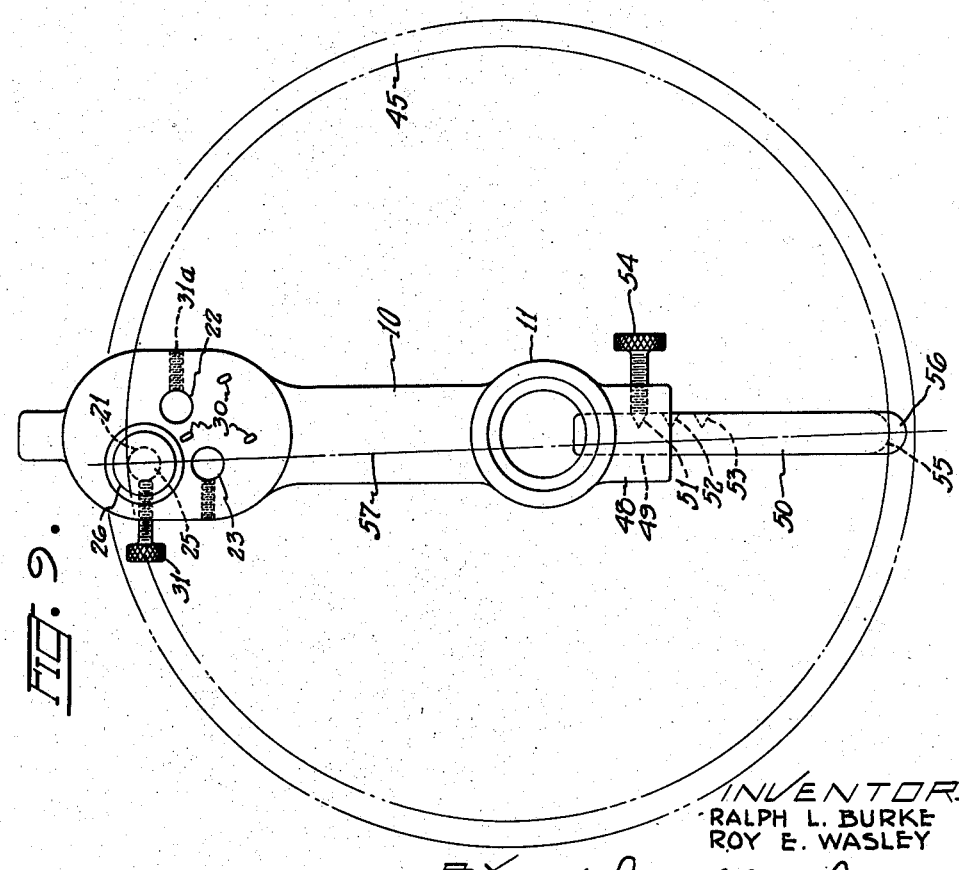
INVENTORS
RALPH L. BURKE
ROY E. WASLEY
BY Cook and Schermerhorn
ATTORNEYS Patented May 15, 1951

2,553,525

UNITED STATES PATENT OFFICE 2,553,525

BRAKE GAUGE

Ralph L. Burke and Roy E. Wasley,
Portland, Oreg.

Application October 19, 1946, Serial No. 704,312

14 Claims. (Cl. 33—180)

This invention relates to a gauge for use in adjusting automobile brake shoes to fit the brake drums with the proper clearance therearound.

Automobile brakes, are, for the most part, of the internal expanding shoe type wherein a plurality of arcuate brake shoes are normally held in inactive positions closely spaced within the internal cylindrical braking surface of a brake drum attached to the wheel of the vehicle. Braking effort is exerted upon the brake drum by a brake operating mechanism which is effective to force the brake shoes into frictional engagement with the braking surface of the drum. To keep the braking system in proper operating condition it is necessary to maintain rather definite clearances between the frictional surfaces of the linings on the brake shoes and the braking surface of the drum, which clearances should not vary in the life of the vehicle. Since both the brake linings and the drums are subject to wear in normal usage, it therefore becomes necessary to provide adjusting mechanism to move the brake shoes outwardly from time to time as the clearance becomes increased by such wear. When the linings become worn thin after repeated adjustment they are replaced by new linings, which requires adjustment of the brake shoes inwardly to provide sufficient space for the increased lining thickness within the brake drum. Also, it may occasionally be necessary after long periods of use to turn down the brake drum on a lathe or special machine to restore the surface to a true, smooth cylindrical shape. Thus, when the linings are replaced, or when the drum is turned down to a slightly larger inside diameter, it becomes even more important to obtain an accurate adjustment of the brake shoes so that they will fit and operate properly under the new conditions. Moreover, the usual segmental brake shoes have heel and toe ends which have different amounts of movement by the brake operating mechanism and for which individual adjustments are provided to obtain different clearances in relaxed condition.

Because of the lack of convenient and accurate gauging instruments, brakes have heretofore usually been adjusted largely by a trial and error procedure in which the various adjustments are tightened to expand the brake shoes into contact with the drum all around, and then loosened until the wheel can be turned by hand. Such procedure will usually put the brakes in operating condition, and when practiced by an experienced mechanic will produce the proper feel in the brake pedal so that the user of the vehicle will be satisfied for the moment, but this manner of adjustment is at best haphazard and very likely to produce uneven wear of the brake lining through lack of proper coordination between the heel and toe adjustments in the individual shoes. On some types of brakes all the points of adjustment are not accessible until the wheel and brake drum are removed, making it necessary to use a gauge of some kind to determine the position of the shoes within the drum.

Gauges heretofore proposed for use in adjusting brakes have invariably proven unsatisfactorily in several respects. Some have been of too flimsy and delicate construction for garage use, and others have been so cumbersome and awkward that mechanics were reluctant to take the trouble to use them. A universal objection to all prior art devices for this purpose has been the use of sliding parts and adjustments usually involving sliding scales or indexes which had to be moved to set positions or from which readings had to be taken to thousandths of an inch. In many cases the mechanism was totally incapable of giving such fine measurements, and in any event gauges which require painstaking adjustment and involved calculation are not suited to garage requirements. This is especially true in connection with classes of garage work such as brake adjusting which are ordinarily delegated to relatively unskilled or apprentice mechanics.

In using many of the prior art gauges it is first necessary to chalk the inside of the brake drum, then remount the wheel and spin it while expanding the brake shoes until chalk is transferred thereto. The wheel must again be removed to determine approximately the diameter of the brake drum by measuring the radius of the chalked portion of the brake shoe. This preliminary procedure is obviously time consuming and inaccurate, and at best produces only approximation rather than precision of adjustment.

The principal object of the present invention is, therefore, to provide a rugged and reliable gauge which will simplify rather than complicate a brake adjusting operation for a relatively unskilled mechanic. Other objects are to provide a brake gauge without sliding parts requiring fine adjustment, to provide a gauge which may be used on different standard size brake drums, and to provide a gauge wherein the changes required to adapt it to different sizes of brake drums require a minimum amount of experience and mental calculation on the part of the mechanic. A further object is to provide a simple instrument for gauging both the inside diameter of the brake drum and the outside diameter of the brake shoes to enable new linings to be accurately and quickly adjusted to fit old and oversize drums.

In the present device the gauging is accomplished by an eccentric dial shaft which may be inserted in one of several holes on a radial arm having a hub to fit the wheel axle or spindle. The holes in which the dial shaft is mounted are accurately positioned at different radial distances from the center of the hub for certain standard sizes of brake drums so that there is no problem of fine adjustment of the length of the radial arm. Measurements are read on a micrometer dial rotatable with the dial shaft so as to have sufficient magnification of movement to make variations of a few thousandths of an inch easily obtainable. When the gauge hub is thus mounted on the axle or spindle, the dial shaft projects across the braking surface of the brake shoes so that the device may easily be swung to gauge the heel and toe ends of each shoe in a simple operation.

The correct adjustment of the shoes for an oversize brake drum is obtained by inserting a radial pin in the proper position on one side of the instrument hub to gauge the internal drum diameter between the dial shaft and the end of the pin. The instrument is designed so that it is not necessary to know the actual diameter of the drum in inches but only to note the setting of the dial shaft scale with respect to an index on the gauge arm to determine whether the drum is standard size or a few thousandths oversize, and this oversize measurement is the only one that needs to be considered in subsequently adjusting the dial shaft for the brake shoes. The necessary readings and adjustments are obtained without the use of sliding parts. All the measurements necessary for a complete brake adjustment are accomplished by the one gauge since it is adapted to make an inside diameter measurement on the brake drum and an outside radius measurement on the brake shoes.

Other objects and advantages of the invention will become apparent from the following description taken in connection with the accompanying drawings, it being understood that the same are by way of illustration and example only and are not to be taken as in any way limiting the spirit and scope of the invention. The invention is to be limited only by the terms of the appended claims.

In the drawings:

Figure 6 is an end elevational view showing the manner of using the gauge of Figure 1 in a brake drum shown in phantom;

Figure 7 is a side view of the parts shown in Figure 6, parts of the gauge being broken away and the brake drum being shown in phantom section;

Figure 8 is a sectional view taken on the line 8—8 of Figure 7;

Figure 9 is a view similar to Figure 6 of a modified form of brake gauge applied to a brake drum shown in phantom; and Figure 10 is a side view of the gauge shown in Figure 9, the brake drum being shown in phantom section.

Figure 1:
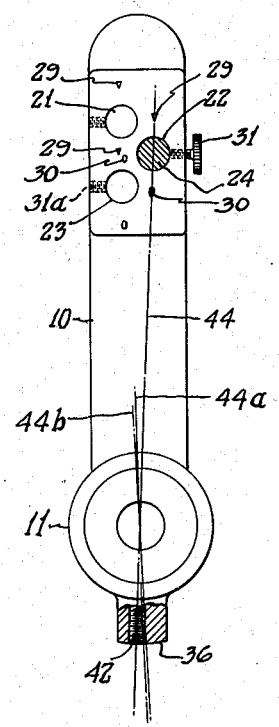
Figure 1 is an end elevation view of one form of a gauge embodying the principles of the present invention, certain parts being broken away.
Figure 4:
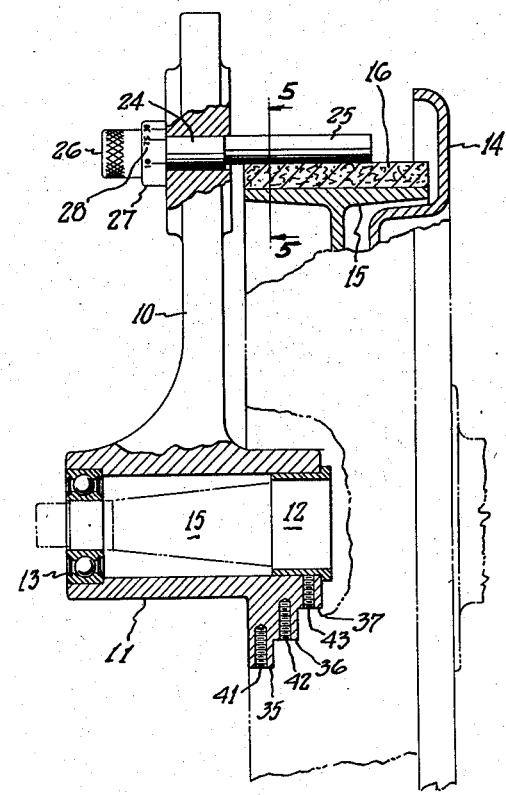
Figure 4 is a view partly in side elevation and partly in section showing the manner of using the gauge on automobile brake shoes.
Figure 2:
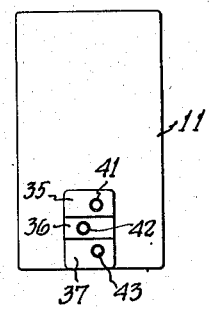
Figure 2 is a bottom plan view of the gauge shown in Figure 1.

As shown in Figures 1 and 4, the body of the gauge comprises a rigid radial arm 10 formed integrally with a tubular hub 11 adapted to be revolvably mounted on the axle or wheel spindle associated with the brakes which are to be adjusted. Through the use of a removable adapter bushing 12 and a bearing assembly 13, the device is adaptable to use on both the front and rear wheels of different makes of automobiles, the gauge being shown in Figure 4 mounted for rotation on a stationary wheel spindle 15 having associated therewith the usual brake plate 14 and brake shoes 15. A portion of one of these brake shoes appears in section in Figure 4, provided with the usual brake lining 16, it being understood that these brake shoes and linings are arcuately segmental in shape to fit within a cylindrical brake drum on the wheel which is normally mounted on the spindle 15.

In the present embodiment the arm 10 is provided with three holes 21, 22 and 23 at different radial distances from the axis of the hub 11 corresponding to three of the most common diameters of automobile brake drums. Each of these holes is adapted to receive a cylindrical journal portion 24 on a dial shaft 25 so that this shaft may be turned in the hole in which it is inserted by means of the knob end 26. A flange 27 at the base of the knob carries appropriate indicia on a scale 28, preferably designating tens of thousandths of an inch to be read with reference to one or the other of the pair of index marks 29 and 30 arranged on opposite sides of each of the aforementioned holes. A tapped hole 31a extends into each of the holes 21, 22 and 23 from a side face of the arm 10 for receiving a set screw 31 to clamp the dial shaft firmly in any particular rotative position. There is sufficient uniformity in standard makes of automobiles so that the arm 10 may be designed to extend past the edge of the brake shoe substantially in the same plane normally occupied by the end wall of the brake drum to project the dial shaft 25 across the braking surface of the brake lining 16 parallel with the axis of the wheel spindle. The holes 21, 22 and 23 are formed to have a close rotative fit with the journal 24 so there will be no looseness of the dial shaft in the arm 10.

Figure 5:
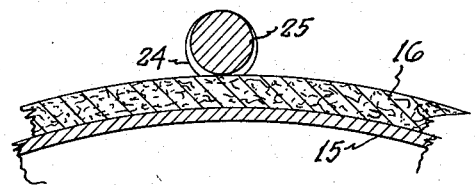
Figure 5 is a sectional view taken on the line 5—5 of Figure 4.

The dial shaft 25 is preferably cylindrical and has an eccentric position in relation to the cylindrical journal 24 as best shown in Figure 5. It will be apparent that when the shaft is rotated about the axis of the journal 24 the surface of the eccentric portion 25 adjacent the brake lining 16 will move to slightly different radial distances from the axis of the spindle 15, and that the different radial distances thus measured by the shaft 25 may be designated by the indicia on scale 28 in terms of thousands of an inch clearance within a new brake drum of standard size. In the present arrangement the indication of this clearance distance is obtained with reference to the index mark 30, and the zero indicium on the scale 28 is on the bottom side of the flange 27 as viewed in Figures 1 and 4, the numbers 10, 25, 30, etc., increasing upwardly on one or both sides of this flange from the zero point. A different arrangement of markings may be used on this scale if desired without departing from the spirit of the invention, and the markings on scale 28 and the index mark 30 may be indexed to any convenient position relative to the eccentricity of the dial shaft 25.

Figure 3:
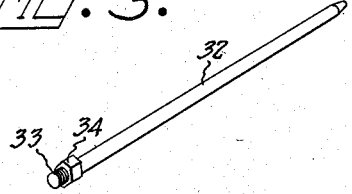
Figure 3 is a perspective view of a removable pin to be inserted in the gauge for gauging brake drums.

Figure 3 illustrates a removable pin 32 which may be associated with the parts just described for gauging the brake drum in a preliminary operation to measure the oversize variation thereof for determining the correct adjustment for the dial shaft in setting the brake shoes. The pin 32 has a threaded end 33 and a polygonal shoulder portion 34 by which it may be tightened in and removed from a tapped hole. On the under side of the hub 11 is a lug or projection having three stepped surfaces 35, 36 and 37 at different radial heights from the hub axis and provided with tapped holes 41, 42 and 43 for receiving the pin 32 in three alternative positions. Each of these stepped surfaces is accurately machined to seat the face of the shouldered portion 34 before the end 33 encounters the bottom of the hole. The center of the hole 41 is on a diametric line with the center of the hole 21, and holes 42 and 43 are similarly diametrically aligned with the centers of holes 22 and 23. This alignment is illustrated in the case of the holes 22 and 42 by the diametric line 44 in Figures 1 and 6, it being observed that the index points 29 and 30 for the hole 22 also lie on this line. The differences in height between the successive stepped surfaces 35, 36 and 37 correspond to the differences in radial distance of the holes 21, 22 and 23 from the axis of the hub 11. The index marks 29 and 30 associated with the holes 21 and 23, and the holes 41 and 43, are positioned on the respective diametric lines 44a and 44b through the centers of these holes as shown in part in Figure 1.

The purpose of this relationship between the mounting holes for the pin 32 and the mounting holes for the dial shaft 25 is illustrated in Figure 6, showing the device applied to a brake drum 45 to gauge its internal diameter. Assuming this particular brake assembly to be of a size which calls for insertion of the dial shaft in the hole 22, the pin 32 is inserted in the hole 42 and tightened until the shoulder portion 34 is firmly seated on the surface 36. The pin 32 is thereby aligned on the diametric line 44 passing through the center of the dial shaft 25 and the index 29, the dimensions of the gauge parts being such that when the brake drum is in new condition the zero indicium on the dial shaft will lie adjacent the index 29 with the dial shaft in contact with one side of the brake drum and the end of pin 32 engaging the other side of the brake drum. It will be noted in this procedure that because of the thickness of the dial shaft the hub 11 does not become centered with respect to the hub of the brake drum, the drum gauging being purely a diametric measurement. Only the index mark 29 necessary for gauging the particular drum 45 is shown in Figure 6.

As the brake drum 45 becomes worn, or after it has been turned down one or more times on a lathe, the internal diameter is found to be slightly larger than when new, and this enlargement of the brake drum diameter will be indicated on the dial shaft scale by the number appearing adjacent the index 29 when the brake drum is gauged as shown in Figures 6 and 7. To obtain this reading the dial shaft may be turned in either direction from its zero position, as will be apparent from Figure 8. It will be observed that the zero position of the dial shaft shown in Figure 8 for gauging the drum is exactly 180° from its zero position for gauging the brake linings shown in Figure 5, which accounts for the use of the two index marks 29 and 30 on opposite sides of each dial shaft hole 21, 22, and 23, and for the offset of the hub 11 from the brake drum center in Figures 6 and 7. In Figure 8 the fact that the dial shaft is in its minimum diameter, or zero rotative, position indicates that the drum is of standard size and has not been turned down to a larger internal diameter. The brake gauge is constructed so that the zero radius measurement shown in Figures 4 and 5 is exactly half the zero diameter measurement shown in Figures 7 and 8.

For large size brake drums the dial shaft gauging element 25 is inserted in the outer hole 21 and the pin 32 is inserted in the hole 41 where the base surface 35 is farther from the hub 11 than the base surface 36 by the same amount that the hole 21 is spaced radially outwardly from the hole 22. In gauging the drum the scale 28 is read on the index 29 associated with the hole 21, the value read on the scale indicating the enlargement of the drum inside diameter from its original diameter in new condition.

For small size brake drums the same procedure is followed with the dial shaft gauging element 25 inserted in the inner hole 23 and the pin 32 inserted in the hole 43. The same gauging element 25 and pin 32 are used for each brake drum size, and it is apparent that the device may be made for more than three sizes, if desired.

In lieu of the stepped surfaces 35, 36 and 37 for mounting the pin 32 at different radial lengths, the mounting holes 41, 42 and 43 may be located on a common surface and three pins of different lengths provided, one for each hole, the difference in lengths of the pins corresponding to the difference in radial distances of the mounting holes 21, 22 and 23 from the center of the hub. However, to avoid confusion in mounting the proper pin in the proper hole and to avoid loss of loose parts, it is preferred to use but one pin 32 in each of the holes 41, 42 and 43 interchangeably, as illustrated.

After a brake drum has been gauged in the manner described, the pin 32 is removed and the gauge is inserted on the spindle and applied to the brake mechanism as shown in Figure 4 with the dial shaft 25 in the same hole in which it was placed to gauge the brake drum. By way of example let it be assumed that the brake drum proves to be of exactly the proper diameter in new condition corresponding to the factory specifications, as indicated by a zero setting of the dial shaft with reference to the index 29 when the gauge was in the drum. Rotation of the dial shaft through 180° to bring the zero indicium to the index mark 30 when the gauge is mounted on the spindle then indicates by an outside measurement exactly the radius of the brake drum so that if the brake lining were adjusted out to this setting as shown in Figures 4 and 5 there would be zero clearance between the lining and the drum. A predetermined proper clearance is obtained by adjusting the brake shoes inwardly until they just meet the surface of the dial shaft when it is turned to bring the marking on the scale 28 designating the correct clearance value around to the index 30. Turning the dial shaft in either direction from its zero position with reference to the index 30 increases the indicated clearance at the same rate, thus enabling the markings shown on the scale 28 to be duplicated in the same arrangement on the other side of the flange 27 if desired to avoid confusion which might result from the possibilities of right and left-hand rotation. The maximum clearance adjustment obtainable on the gauge is indicated when the dial shaft is turned 180° from the position shown in Figures 4 and 5. When the desired setting has been made on the dial shaft and the brake shoes are adjusted to this radius all around there will be uniform clearance inside of the brake drum when the wheel is mounted on the spindle. If it is desired to set the heel and toe of each brake shoe to different clearances, this may readily be done by appropriately changing the setting of the dial shaft for heel and toe measurements.

When a brake drum is found to be oversize by gauging in the manner shown in Figures 6 and 7, the brake bands must, of course, be adjusted out to a larger radius to maintain the desired clearance. If, for instance, the internal diameter of the brake drum is found to be ten thousandths of an inch larger than its diameter in new condition, then the nominal clearance for the brake shoes must be reduced by half of this amount, or five thousandths of an inch, in the dial shaft figure which is set to the index 30 when the gauge is applied to the brake linings as in Figure 4. In such case the number on the dial shaft scale which would be set to the index 30 would be the value of the proper nominal clearance less five thousandths of an inch. Thus having made allowance for the increased diameter of the brake drum the desired nominal clearance may be maintained according to the brake manufacturer's specification so that the brakes will operate the same as in new drums.

Figures 9 and 10 illustrate a modified form of gauge in which the drum gauging pin is set to different depths in a single hole in a socket on the hub of the gauge. This gauge has certain features in common with the embodiment shown in the preceding figures and corresponding parts are identified by the same reference numerals. Thus the hub 11 carries an arm 10 having three holes 21, 22 and 23 for mounting the dial shaft gauge element 25 at different radial distances for three standard sizes of brake shoes and brake drums. A single reference or indexmark 30 is associated with each of the holes 21, 22, 23 to provide a single zero position for the gauge element 25 in each of these holes. The gauge element is in zero position when its drum and shoe engaging surfaces are at minimum distance from hub 11, as shown in Figure 8. The holes 21, 22, 23 are spaced from the hub 11 so that the radius distance from the axis of hub 11 to the shoe engaging portion of gauge element 25 will be equal to a standard drum radius when the gauge element is in zero position in each of the holes.

On the side opposite the arm 10 the hub 11 in this embodiment has a boss 48 having a square hole 49 to receive a square drum gauging pin 50 in diametric alignment with the arm 10. The pin 50 is provided on one of its flat sides with three conical depressions 51, 52 and 53 adapted to receive the pointed end of a set screw 54 in the boss 48. The hole 49 extends through the wall of the hub 11 so that the pin 50 may project into the central opening of the hub in varying amounts in the different positions in which it may be secured by the set screw. The outer end of the pin 50 is provided with a rounded gauging surface 55 adapted to feel for the diametral chord in the brake drum 45, and a flange or lip 56 adapted to overlie the rim of the brake drum to prevent tilting of the gauge therein. The upper end of the arm 10 is adapted to overlie the other side of the rim of the drum in a similar manner whereby the dial shaft 25 is maintained parallel with the adjacent drum surface without requiring careful manipulation of the gauge.

In this embodiment the pin 50 is seen in Figure 9 to be inclined to the drum diameter which is being measured by reason of the fact that the holes 21, 22 and 23 do not lie in the center of the arm 10, but the indentations 51, 52 and 53 are precisely located so that the gauge will give accurate diameter measurements. Thus the line 57 is the true diameter of the drum which is being gauged, this diameter being drawn between the point of contact of the gauge pin 50 with the drum and the point of contact between the dial shaft 25 and the drum.

When the dial shaft is used in the outer hole 21 the point of the set screw 54 is set in the end depression 51, the depression 52 being used when the dial shaft is in the hole 22 and the depression 53 being used when the dial shaft is in the hole 23. In each of these positions in different sized drums the arm 10 and pin 50 occupy slightly different angular positions relative to the drum diameter and, the depressions 51, 52 and 53 are so placed that in standard sized drums the measured inside diameters are exactly twice the measured outside radii without any calculation or adjustment in converting the diameter measurement to a radius measurement.

It will be apparent that this convenient relationship will be established by locating each depression 51, 52, and 53 so that the drum engaging portion 55 of the pin 50 is spaced from the axis of the hub 11 a distance less than a standard drum radius equal to the thickness of the dial shaft gauging element 25. The diametral distance from point 55 to the drum engaging portion of gauging element 25 will thereby be equal to twice the radius distance from the axis of the hub 11 to the shoe engaging portion of gauging element 25 when the latter is in zero position. In determining the positions of depressions 51, 52, 53 correction may be made to compensate for the obliquity of diametral lines 57 but in practice the obliquity may be made small enough to be disregarded. Thus, neglecting clearance values, opposite surfaces of the gauge element 25 are utilized to indicate an inside diameter measurement for a standard size drum and a corresponding outside radius measurement for shoes to fit the drum, without changing the setting of the gauge element.

When the drum is oversize, the gauge element 25, when applied as shown in Figures 8, 9 and 10, is rotated away from zero position until it contacts the inner periphery of the drum. The amount of wear or oversize of the drum is indicated on the scale 28 with reference to the index mark 30. In order to indicate a brake shoe radius corresponding to such drum diameter the gauge element 25 is rotated back to a setting one-half that obtained in gauging the drum. Then if the gauge is applied to the wheel spindle and the shoes set up to contact the gauge element 25 they will exactly fit the oversize drum, without clearance.

The embodiment of Figures 9 and 10 is intended for use with conventional brake mechanisms without taking clearance into consideration in the gauging procedure. In using the device the heel end of each shoe is first set to contact the gauge element 25. After mounting the wheel, the toe is adjusted to fit the drum, and then backed away from the drum sufficiently to permit the wheel to run freely, thereby providing adequate clearance.

The present gauge is designed to make it easy for a relatively unskilled mechanic to find the true diametral chord of a brake drum and to measure its amount of oversize accurately and quickly without introducing errors through careless use of the gauge. The design features tending to prevent improper use of the gauge are one of the primary advantages of the embodiment shown in Figures 9 and 10, inasmuch as a high degree of accuracy in the gauge itself is of little benefit unless the instrument is capable of being properly used by the average mechanic to insure obtaining a correct reading, particularly in the diametral measurement.

Other changes in the details of construction and arrangement of parts may be resorted to, within the scope of the appended claims.

Having now described our invention and in what manner the same may be used, what we claim as new and desire to protect by Letters Patent is:

1. A brake gauge comprising a hub adapted for mounting on a wheel spindle, a radial arm on said hub, an eccentric gauging element mounted for rotation in said arm toward and from a predetermined zero position for gauging brake shoe radii when said hub is mounted on a wheel spindle, and a pin on said hub extending in a direction opposite from said arm for gauging the internal diameter of a brake drum between said gauging element and the end of said pin, the dimensions of the parts being such that when said gauging element is in zero position an outside radius measurement from the axis of said hub to the near side of said gauging element is equal to one-half said internal diameter measurement.

2. A brake gauge comprising a hub, a radial arm on said hub, said radial arm having a plurality of openings to receive an eccentric gauging element at different radial distances from the axis of said hub, means for mounting a gauge pin on said hub to extend in a direction opposite said arm, and means associated with said mounting means for securing said gauge pin at different radial lengths from said hub such that in one position of said gauging element in each of said openings an outside radius measurement from the axis of said hub to the near side of the gauging element is equal to one-half an internal diameter measurement from the work engaging end of said gauge pin to the remote side of said gauging element.

3. A brake gauge device comprising a hub adapted for mounting on a wheel spindle and the like, an integral radial arm on said hub, said arm having a hole in a fixed position for rotatably mounting an eccentric gauging element, and a gauge pin on said hub extending in a direction opposite said arm for measuring inside diameters between the tip of said gauge pin and the remote side of said gauging element, an outside radius measurement between the axis of said hub and the near side of said gauging element being equal to one-half said inside diameter measurement in one position of said gauging element.

4. A brake gauge device comprising a hub adapted for mounting on a wheel spindle and the like, an integral radial arm on said hub, said arm having a hole in a fixed position for rotatably mounting an eccentric gauging element, and a gauge pin on said hub extending in a direction opposite said arm to measure a predetermined inside diameter between the tip of said gauge pin and the remote side of said gauging element when said gauging element is turned to a minimum diameter position in said hole, the dimensions of the parts being such that when said gauging element is turned in said hole to a predetermined position its near side measures an outside radius between said near side and the axis of said hub equal to one-half said diameter measurement.

5. A brake gauge comprising a hub adapted for mounting on a wheel spindle and the like, an integral radial arm on said hub, an eccentric gauging element, means for rotatably mounting said eccentric gauging element in different fixed positions on said arm, a radial gauge pin, and means for mounting said gauge pin in different fixed positions on said hub such that for corresponding mounting positions of said gauging element and gauge pin an outside radius measured from the axis of said hub to the near side of said gauging element is equal to one-half the inside diameter measured from the tip of said gauging pin to the remote side of said gauging element, said different mounting positions providing radius and diameter changes for use with different size brake assemblies.

6. A brake gauge comprising a hub adapted for mounting on a wheel spindle and the like, an integral radial arm on one side of said hub, an eccentric gauging element, means for rotatably mounting said gauging element in different fixed positions on said arm, a socket on the opposite side of said hub, a radial gauge pin, and means for mounting said pin at different fixed depths in said socket such that in one position of said gauging element in each of said rotatable mounting means an outside radius measurement from the axis of said hub to the near side of the gauging element is equal to one-half an internal diameter measurement from the work engaging end of said gauge pin to the remote side of said gauging element.

7. A brake gauge comprising a hub adapted for mounting on a wheel spindle and the like, a gauge pin adapted for radial mounting in one side of said hub, a radial arm extending from the opposite side of said hub, and an eccentric gauging element rotatably mounted in said arm at a position to give a predetermined inside diameter measurement between said element and the measuring end of said gauge pin equal to twice an outside radius measurement between said element and the axis of said hub in one position of said gauging element.

8. A dual purpose gauge for adjusting brake shoes for a brake drum comprising an integral hub and radial arm, means on said hub to engage the inside surface of said brake drum to gauge its inside diameter, means for centering said hub on a wheel spindle or the like to gauge the outside radius of said brake shoes, and a common eccentric gauging element rotatably mounted in a fixed position on said arm for both of said gauging operations, a side of said element remote from said hub engaging said drum for gauging said inside diameter, and a side of said element toward said hub engaging said brake shoes for gauging said outside radius, the dimensions of the parts being such that in one position of said gauging element said outside radius measurement is equal to one-half said inside diameter measurement.

9. A dual purpose gauge for adjusting brake shoes for a brake drum comprising a radial arm on a hub, means on said hub to engage the inside surface of said drum to gauge its inside diameter, means for centering said hub on a wheel spindle or the like to gauge the outside radius of said shoes, and a common eccentric gauging element rotatably mounted on said arm to place the side of said element toward said hub at a distance from the hub axis equal to the radius of the drum when the opposite and remote side of said element is adjusted to engage said drum in gauging its inside diameter.

10. A brake gauge comprising a hub, a radial arm on said hub, an eccentric gauging element mounted on said arm for movement relative thereto toward and from a predetermined zero position and having its surface farthest removed from the axis of said hub adapted to engage the braking surface of a brake drum and its surface closest to said axis adapted to engage the braking surface of a brake shoe, and a gauge element on said hub extending in the opposite direction from said arm and having an end portion adapted to engage the braking surface of the brake drum at a point diametrically opposed to the drum engaging surface of said gauging element, said end portion being spaced from the axis of said hub when said eccentric gauging element is in its zero position a distance less than the distance from said axis to said brake shoe engaging surface by an amount equal to the distance between the brake shoe engaging and drum engaging portions of said eccentric gauging element.

11. A brake gauge comprising a hub, a radial arm on said hub, an eccentric gauging element mounted for rotation in said arm for movement relative thereto toward and from a predetermined zero position and having its surface farthest removed from the axis of said hub adapted to engage the braking surface of a brake drum and its surface closest to said axis adapted to engage the braking surface of a brake shoe, and a gauge pin on said hub extending in the opposite direction from said arm and having an end portion adapted to engage the braking surface of the brake drum at a point diametrically opposed to the drum engaging surface of said gauging element, said end portion being spaced from the axis of said hub when said gauging element is in its zero position a distance less than the distance from said axis to the brake shoe engaging surface of said gauging element by an amount equal to the distance between the brake shoe engaging and drum engaging portions of said gauging element.

12. A brake gauge comprising a hub, a radial arm on said hub, an eccentric gauging element extending parallel to the axis of said hub mounted for adjustment relative to said arm toward and from a predetermined zero position and having its surface farthest removed from the axis of said hub adapted to engage the braking surface of a brake drum and its surface closest to said axis adapted to engage the braking surface of a brake shoe, and a gauge pin longitudinally adjustable relative to said hub extending in the opposite direction from said arm and having an end portion adapted to engage the braking surface of the brake drum at a point diametrically opposed to the drum engaging surface of said gauging element, said end portion being spaced from the axis of said hub a predetermined distance less than the radius of the drum being measured with said gauging element in zero position, and the distance between the drum and shoe engaging surfaces of said gauging element being equal to said predetermined distance.

13. A dual purpose gauge for adjusting brake shoes for a brake drum comprising a hub having an axis defining a center about which the gauge is adapted to rotate, a radial arm on said hub on one side of the center thereof and having an end portion adapted to engage the inner surface of a brake drum, a second radial arm on said hub on the other side of its center, a gauge member having a part carried by said second arm and rotatable on an axis parallel with the axis of said hub toward and from a predetermined zero position, a cylindrical gauge element carried by said part with its axis eccentric to the axis of said part, the arrangement being such that the distance between the drum-engaging end portion of said first radial arm and surface of said gauge element farthest removed from said center defines the drum diameter, and the distance from said drum-engaging end portion to said center is less than the drum radius by an amount equal to the diameter of said gauging element.

14. A dual purpose gauge for adjusting brake shoes for a brake drum comprising a hub having an axis defining a center about which the gauge is adapted to rotate, a radial arm on said hub on one side of the center thereof and having an end portion adapted to engage the inner surface of a brake drum, a second radial arm on said hub on the other side of its center, a gauge member having a part carried by said second arm and adjustable thereon toward and from a predetermined zero position, an elongated gauge element carried by said part and extending parallel to the axis of said hub, the arrangement being such that the distance between the drum-engaging end portion of said first radial arm and surface of said gauge element farthest removed from said hub axis defines the drum diameter, and the distance from said drum-engaging end portion to said hub axis is less than the drum radius by an amount equal to the width of said gauge element.

RALPH L. BURKE.
ROY E. WASLEY.

REFERENCES CITED

The following references are of record in the file of this patent:

UNITED STATES PATENTS

| Number | Name | Date |
|---|---|---|
| 1,249,804 | Moore | Dec. 11, 1917 |
| 1,891,185 | Miller et al. | Dec. 13, 1932 |
| 1,898,136 | Miller et al. | Feb. 21, 1933 |
| 1,994,190 | Carthew | Mar. 12, 1935 |
| 2,005,870 | Miller et al. | June 25, 1935 |
| 2,083,944 | Cottrell | June 15, 1937 |
| 2,085,380 | Muller | June 29, 1937 |
| 2,087,497 | Blackman | July 20, 1937 |
| 2,268,354 | Thomason | Dec. 30, 1941 |
| 2,341,796 | Kuna et al. | Feb. 15, 1944 |

FOREIGN PATENTS

| Number | Country | Date |
|---|---|---|
| 28,854 | Great Britain | Dec. 16, 1896 |
| 319,532 | Italy | July 13, 1934 |